United States Patent
Jo et al.

(10) Patent No.: US 12,005,883 B2
(45) Date of Patent: Jun. 11, 2024

(54) CONTROL APPARATUS AND METHOD OF HYBRID VEHICLE

(71) Applicants: HYUNDAI MOTOR COMPANY, Seoul (KR); KIA CORPORATION, Seoul (KR)

(72) Inventors: Mingyun Jo, Seoul (KR); Jeewook Huh, Seoul (KR); Hoon Han, Hwaseong-si (KR); Gwangil Du, Ansan-si (KR); Jae Young Choi, Seoul (KR); Hyukjin Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 290 days.

(21) Appl. No.: 17/473,991

(22) Filed: Sep. 13, 2021

(65) Prior Publication Data
US 2022/0363237 A1 Nov. 17, 2022

(30) Foreign Application Priority Data
May 11, 2021 (KR) ........................ 10-2021-0060439

(51) Int. Cl.
*B60W 10/06* (2006.01)
*B60K 6/24* (2007.10)
(Continued)

(52) U.S. Cl.
CPC ............... *B60W 20/13* (2016.01); *B60K 6/24* (2013.01); *B60K 6/26* (2013.01); *B60K 6/28* (2013.01);
(Continued)

(58) Field of Classification Search
CPC ........... B60W 20/13; B60K 6/24; B60K 6/26; B60K 6/28; B60K 2006/268; B60Y 2200/92; B60Y 2300/91
See application file for complete search history.

(56) References Cited

U.S. PATENT DOCUMENTS 9,096,221 B2 * 8/2015 Kim ...................... B60W 20/14
9,650,034 B2 * 5/2017 Kim ...................... B60K 6/387
(Continued)

FOREIGN PATENT DOCUMENTS

KR 10-1360500 B1 2/2014

*Primary Examiner* — Gonzalo Laguarda
(74) *Attorney, Agent, or Firm* — MCDONNELL BOEHNEN HULBERT & BERGHOFF LLP

(57) ABSTRACT

A control apparatus of a hybrid vehicle includes an input and output module for a driver to select a driving mode, an engine that generates power required for vehicle driving by fuel combustion, a driving motor that generates power required for vehicle driving and operates as a generator, a hybrid starter-generator (HSG) that starts the engine and operates as a generator, and a controller. When the driving mode is inputted to a stopping mode through the input and output module, based on an expected stop time, a current SOC of a battery, a target SOC of the battery, output of the driving motor, and output of the HSG, the controller that performs a first charging mode that charges the power generated by the engine in the battery through the driving motor and a second charging mode that charges the power generated by the engine in the battery through the driving motor and the HSG.

8 Claims, 2 Drawing Sheets

(51) Int. Cl.
  *B60K 6/26*   (2007.10)
  *B60K 6/28*   (2007.10)
  *B60W 20/13*  (2016.01)

(52) U.S. Cl.
  CPC ..... *B60K 2006/268* (2013.01); *B60Y 2200/92* (2013.01); *B60Y 2300/91* (2013.01)

(56) References Cited

U.S. PATENT DOCUMENTS

| | | | |
|---|---|---|---|
| 9,682,695 B2 * | 6/2017 | Amano | B60W 10/08 |
| 10,118,605 B2 * | 11/2018 | Zhao | B60K 6/448 |
| 10,434,987 B2 * | 10/2019 | Yoo | B60K 28/00 |
| 2013/0154576 A1 | 6/2013 | Shin et al. | |
| 2021/0295219 A1 * | 9/2021 | Shimamoto | H04W 4/44 |

\* cited by examiner

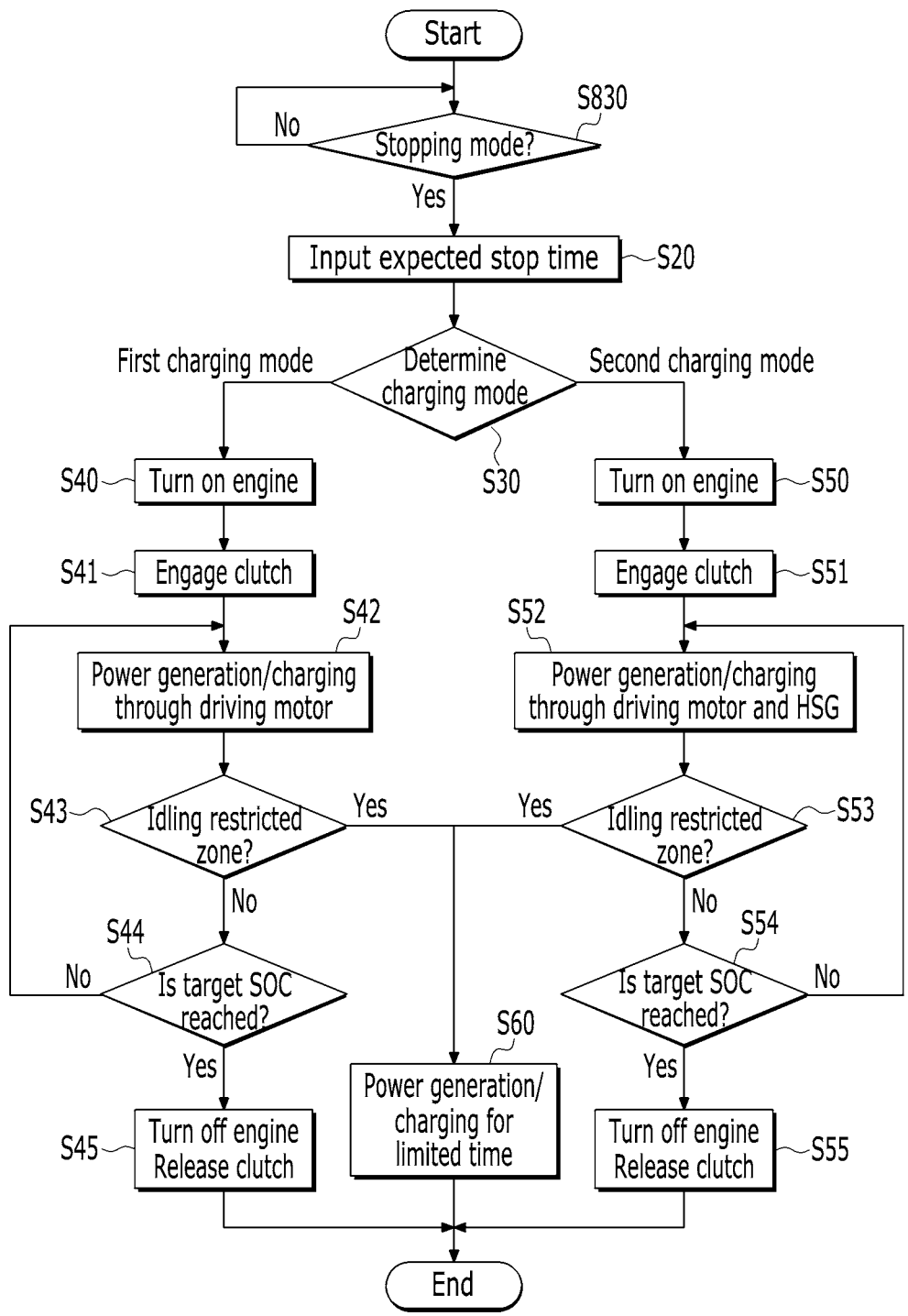

CONTROL APPARATUS AND METHOD OF HYBRID VEHICLE

CROSS REFERENCE TO RELATED APPLICATIONS

This application claims priority to and the benefit of Korean Patent Application No. 10-2021-0060439 filed in the Korean Intellectual Property Office on May 11, 2021, the entire contents of which are incorporated herein by reference.

BACKGROUND

(a) Field

The present disclosure relates to a control apparatus and method of a hybrid vehicle.

(b) Description of the Related Art

A hybrid vehicle is a vehicle using two or more power sources, and generally refers to a hybrid electric vehicle driven by using an engine and a motor. A hybrid electric vehicle may have various structures using two or more power sources including an engine and a motor.

A clutch is disposed between an engine and a driving motor, and the hybrid electric vehicle is driven in an electric vehicle (EV) mode or in a hybrid electric vehicle (HEV) mode, depending on whether the clutch is engaged. The EV mode is a mode in which a vehicle is driven by only driving torque of the driving motor, the HEV mode is a mode in which the vehicle is driven by driving torque of the driving motor and the engine.

In the hybrid vehicle, it is important to manage a state of charge (SOC), which is a charge amount of a battery that supplies electric power to the driving motor and electrical components provided in the vehicle.

Recently, as a capacity of the battery applied to the hybrid vehicle increases, use of various electrical components when the vehicle is stopped is increasing.

However, in a state in which the SOC of the battery is low and the vehicle is stopped, the use of electrical components increases, a situation in which the engine is turned on to charge the battery frequently occurs, which may increase customer inconvenience.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a control apparatus and method of a hybrid vehicle that may quickly charge a battery in a situation where an SOC of the battery is low and a vehicle is stopped.

An embodiment of the present disclosure provides a control apparatus of a hybrid vehicle, including an input and output module for a driver to select a driving mode, an engine that generates power required for vehicle driving by fuel combustion, a driving motor that generates power required for vehicle driving and selectively operates as a generator, a hybrid starter-generator (HSG) that starts the engine and selectively operates as a generator; and when the driving mode is inputted to a stopping mode through the input and output module, based on an expected stop time, a current SOC of a battery, a target SOC of the battery, output of the driving motor, and output of the HSG, a controller that selectively performs a first charging mode that charges the power generated by the engine in the battery through the driving motor and a second charging mode that charges the power generated by the engine in the battery through the driving motor and the HSG.

When a time required to reach the target SOC from the current SOC by using the output of the driving motor is within the expected stop time, the controller may perform the first charging mode.

In the first charging mode, the controller may turn on the engine, and the driving motor may convert power outputted from the engine into electrical energy to charge the battery.

When a time required to reach the target SOC from the current SOC through the output of the driving motor exceeds the expected stop time, the controller may perform the second charging mode.

In the second charging mode, the controller may turn on the engine, and the driving motor and the HSG may convert power outputted from the engine into electrical energy to charge the battery.

When a position where the vehicle is stopped may be in an idling restricted zone, the controller may charge the battery only for a set time in the idling restricted zone.

Another embodiment of the present disclosure provides a control method of a hybrid vehicle, including receiving, by an input and output module, a driving mode of the hybrid vehicle, receiving, by the input and output module, an expected stop time when the driving mode of the vehicle is a stopping mode, determining, by a controller, a charging mode while the vehicle is stopped based on the expected stop time, a current state of charge (SOC) of a battery, a target SOC, output of a driving motor, and output of an HSG, and charging the battery according to the charging mode while the vehicle is stopped.

The charging mode while the vehicle is stopped may include a first charging mode that charges the power generated by the engine in the battery through the driving motor, and a second charging mode that charges the power generated by the engine in the battery through the driving motor and the HSG.

When a time required to reach the target SOC from the current SOC by using the output of the driving motor is within the expected stop time, the charging mode while the vehicle is stopped may be determined to be the first charging mode.

When a time required to reach the target SOC from the current SOC through the output of the driving motor exceeds the expected stop time, the charging mode while the vehicle is stopped may be determined to be the second charging mode.

The control method of the hybrid vehicle may further include identifying, by a navigation device, an idling restricted zone on a driving route of the vehicle, and determining, by a GPS module, whether a position where the vehicle is stopped is the idling restricted zone.

The control method of the hybrid vehicle may further include, when the position where the vehicle is stopped is in the idling restricted zone, charging the battery for a limited time in the idling restricted zone.

According to the control apparatus and method of the hybrid vehicle according to the embodiment of the present disclosure as described above, it is possible to quickly charge a battery through a driving motor while a vehicle is stopped.

In addition, by charging the battery through the driving motor, or the driving motor and an integrated starter-generator, it is possible to improve charging efficiency of the battery.

BRIEF DESCRIPTION OF THE FIGURES

These drawings are for reference only in describing embodiments of the present disclosure, and therefore, the technical idea of the present disclosure should not be limited to the accompanying drawings.

FIG. 2 illustrates a flowchart of a control method of a hybrid vehicle according to an embodiment of the present disclosure.

DETAILED DESCRIPTION

Figure 1:
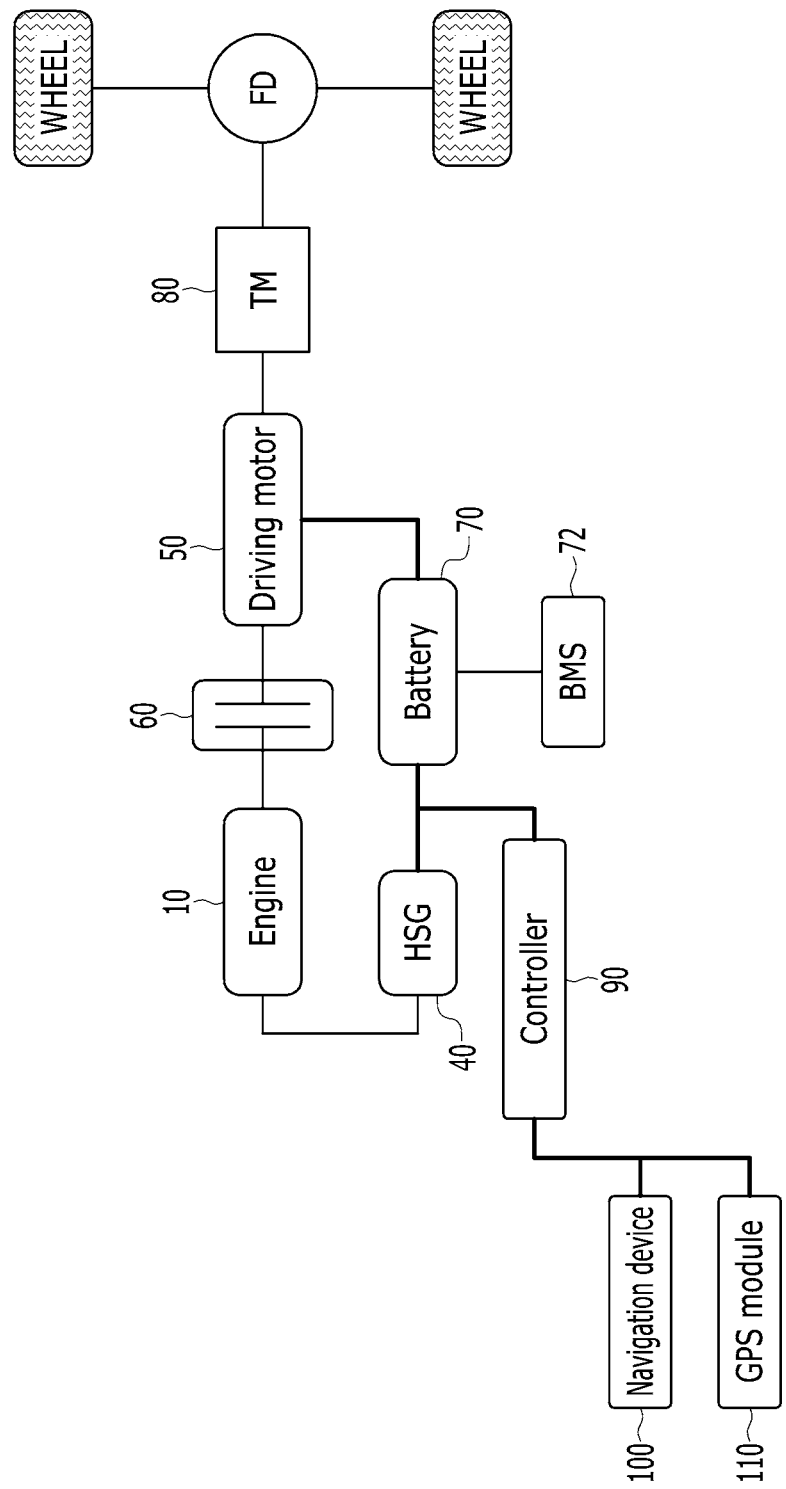
FIG. 1 illustrates a block diagram of a control apparatus of a hybrid vehicle according to an embodiment of the present disclosure.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

In order to clearly describe the present disclosure, parts that are irrelevant to the description are omitted, and identical or similar constituent elements throughout the specification are denoted by the same reference numerals.

In addition, since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

Hereinafter, a control apparatus of a hybrid vehicle according to an embodiment of the present disclosure will be described in detail with reference to the accompanying drawing.

FIG. 1 illustrates a block diagram of a control apparatus of a hybrid vehicle according to an embodiment of the present disclosure.

As shown in FIG. 1, a control apparatus of a hybrid vehicle according to an embodiment of the present disclosure may include an engine 10, a hybrid starter and generator (HSG) 40, a driving motor 50, a clutch 60, a battery 70, a battery management system 72, an input and output module (not shown), and a controller 90.

The engine 10 generates power required for vehicle driving by combusting fuel.

When a request to start the vehicle occurs, the HSG 40 starts the engine 10, and selectively operates as a generator in a state in which the engine 10 is started to generate electrical energy. The electrical energy generated through the HSG 40 is charged in the battery 70. When a driver moves a starting key to a starting-on position or presses a starting button, it may be determined that there is a request to start the vehicle.

The driving motor 50 assists the power of the engine 10, and selectively operates as a generator to generate electrical energy.

The HSG 40 and the driving motor 50 are operated by using the electrical energy charged in the battery 70, and the electrical energy generated by the HSG 40 and the driving motor 50 is charged in the battery 70.

The battery management system (BMS) 72 determines a state of the battery 70 based on information of the battery 70 detected by a plurality of sensors (for example, a temperature sensor, a voltage sensor, etc.), and manages the battery 70 so that the battery 70 is managed at an optimal state. Particularly, the battery management system 72 measures the remaining capacity of the battery 70, maintains a state of charge (SOC) of the battery 70 at an appropriate level, and measures and manages a temperature of the battery 70.

The clutch 60 is provided between the engine 10 and the driving motor 50. Depending on whether the clutch 60 is engaged, the hybrid vehicle may be driven in an electric vehicle (EM) mode or a hybrid electric vehicle (HEV) mode. The EV mode is a mode in which the vehicle travels only with the driving force of the driving motor 50, and the HEV mode is a mode in which the vehicle travels with the driving force of the driving motor 50 and the engine 10.

The power outputted from the engine 10 and the driving motor 50 is transmitted to a driving wheel provided in the vehicle. In this case, a transmission 80 is provided between the clutch 60 and the driving wheel. A shifting gear is installed inside the transmission 80, and the power outputted from the engine 10 and the driving motor 50 may be changed depending on a shifting gear stage.

The controller 90 controls constituent elements of the vehicle including the engine 10, the HSG 40, the driving motor 50, the battery 70, the input and output module, and the clutch 60.

The controller 90 may be provided as at least one processor executed by a predetermined program, and the predetermined program is configured to perform respective steps of a control method of a hybrid vehicle according to an embodiment of the present disclosure.

The input and output module receives a driving mode of the vehicle from a driver (or user), and the controller 90 operates the vehicle in the driving mode inputted by the driver through the input and output module. In some embodiments, the input and output module may be a cluster or an audio video navigation (AVN) provided in the vehicle. In the embodiment of the present disclosure, the input and output module may function as an input module that receives a driver's instruction and/or an output module that provides vehicle information to the driver, as necessary.

The vehicle driving mode may include a fuel efficiency mode (eco mode), a normal mode, a snow mode, a comfort mode, a sports mode, and a stopping mode.

The eco mode means a mode for realizing high fuel efficiency, and means a mode in which a speed of the engine 10 in which the shifting is performed is lower than that in the general driving mode. The sports mode means a mode for improving acceleration performance of the vehicle, and a driving mode in which the vehicle uses a high speed of the engine 10. The snow mode means a driving mode that prevents the vehicle from slipping on a slippery road such as a snowy road. The comfort mode means a driving mode in which vehicle occupants feel comfortable and that maximizes riding comfort by reducing noise. The general mode means a driving mode of the vehicle that is not a special mode such as an eco mode, a sports mode, a snow mode, and a comfort mode. The stopping mode means a mode in which the battery 70 is charged through the driving motor 50, or the driving motor 50 and the HSG 40 while the vehicle is stopped.

The hybrid vehicle according to the embodiment of the present disclosure may include a navigation device 100 and a global positioning system (GPS) module 110 for detecting a position of the vehicle.

The navigation device 100 receives a departure point and a destination from the driver and calculates a driving route of the vehicle, and driving information including a congestion degree and a gradient of the driving route is stored in the controller 90. The driving route calculated by the navigation device 100 may be provided to the driver through the input and output module.

The position of the vehicle is detected through the GPS module 110, and the position of the vehicle detected by the GPS module 110 is transmitted to the controller 90.

Hereinafter, a control method of a hybrid vehicle according to an embodiment of the present disclosure will be described in detail with reference to the accompanying drawings.

FIG. 2 illustrates a flowchart of a control method of a hybrid vehicle according to an embodiment of the present disclosure.

As shown in FIG. 2, the controller 90 determines whether the driving mode of the vehicle is set to the stopping mode at S10. The driver may set the driving mode of the vehicle through the input and output module.

When the stopping mode is set, the controller 90 receives an expected stop time at S20. In this case, the driver may input the expected stop time through the input and output module, and the expected stop time inputted by the driver through the input and output module is transmitted to the controller 90.

The controller 90 determines a charging mode during stopping based on the expected stop time inputted through the input module, the current SOC of the battery 70 transmitted from the battery management system 72, the target SOC, the output of the driving motor 50, and the output of the HSG 40 (at 30.

The charging mode while the vehicle is stopped may include a first charging mode and a second charging mode. The first charging mode is a mode for charging the battery 70 through the driving motor 50, and the second charging mode is a mode for charging the battery 70 through the driving motor 50 and the HSG 40.

Since the first charging mode charges the battery 70 by using only the driving motor 50, it is a general charging mode that charges the battery 70 relatively slower than the second charging mode. Since the second charging mode charges the battery 70 by using the driving motor 50 and the HSG 40, it is a fast charging mode that charges the battery 70 relatively faster than the first charging mode.

Specifically, the controller 90 determines the charging mode while the vehicle is stopped based on the output of the driving motor 50, the output of the HSG 40, the current SOC, and the target SOC.

To this end, the controller 90 determines whether a time required to reach the target SOC from the current SOC through the output of the driving motor 50 exceeds the expected stop time.

Generally, the output of the driving motor 50 mounted on the hybrid vehicle is significantly larger than the output of the HSG 40. For example, the output of the driving motor 50 may be 44 kW, and the output of the HSG 40 may be 11 kW.

The time required to charge the battery 70 from the current SOC to the target SOC by using only the driving motor 50 may exceed the expected stop time. In this case, the controller 90 may determine the charging mode while the vehicle is stopped as the second charging mode (or fast charging mode).

In contrast, when the time required to charge the battery 70 from the current SOC to the target SOC by using only the driving motor 50 is within the expected stop time, the controller 90 sets the charging mode while the vehicle is stopped to the first charging mode (or general charging mode).

When the charging mode while the vehicle is stopped is determined to be the first charging mode, the controller 90 turns on the engine 10 through the HSG 40 at S40, and engages the engine 10 with the driving motor 50 through the clutch 60 at S41.

As the engine 10 operates, the speed of the engine 10 and the speed of the driving motor 50 are synchronized, and the power of the engine 10 is transmitted to the driving motor 50. In this case, the driving motor 50 operates as a generator, so that the power of the engine 10 is converted into electrical energy by the driving motor 50, and the electrical energy generated by the driving motor 50 is charged in the battery 70 at S42.

When the SOC of the battery 70 reaches the target SOC at S44, the controller 90 turns off the engine 10 and releases the coupling of the clutch 60 at S45.

The controller 90 indicates on the input/output module that charging of the battery 70 is complete.

Before the SOC of the battery 70 reaches the target SOC, the controller 90 detects an idling restricted zone on the driving route of the vehicle through the navigation device 100, and determines whether a position where the vehicle is stopped is the idling restricted zone through the GPS module 110 at S43. When the vehicle's stopping position is within the idling restricted zone, the controller 90 may charge the battery 70 only during a time being limited in the idling restricted zone at S60, and may indicate on the input and output module that the charging is finished.

When the charging mode while the vehicle is stopped is determined to be the second charging mode, the controller 90 turns on the start of the engine 10 through the HSG 40 at S50, and engages the engine 10 with the driving motor 50 through the clutch 60 at S51.

As the engine 10 operates, the speed of the engine 10 and the speed of the driving motor 50 are synchronized, and the power of the engine 10 is transmitted to the driving motor 50 and the HSG 40. In this case, the driving motor 50 and the HSG 40 operate as generators, so that the power of the engine 10 is converted into electrical energy by the driving motor 50 and the HSG 40, and the electrical energy generated by the driving motor 50 and the HSG 40 is charged in the battery 70 at S52.

When the SOC of the battery 70 reaches the target SOC at S54, the controller 90 turns off the engine 10 and releases the coupling of the clutch 60 at S55.

The controller 90 indicates on the input/output module that charging of the battery 70 is complete.

Before the SOC of the battery 70 reaches the target SOC, the controller 90 detects an idling restricted zone on the driving route through the navigation device 100, and determines whether a position where the vehicle is stopped is the idling restricted zone through the GPS module 110 at S53. When the vehicle's stopping position is within the idling restricted zone, the controller 90 may charge the battery 70 only during a time being limited in the idling restricted zone at S60, and may indicate on the input and output module that the charging is finished.

According to the control apparatus and method of the hybrid vehicle according to the embodiment of the present disclosure as described above, it is possible to quickly charge the battery 70 through the driving motor 50 while the vehicle is stopped.

In addition, by charging the battery 70 through the driving motor 50 or through the driving motor 50 and the HSG 40, the charging efficiency of the battery 70 may be improved, and fast charging is possible.

Furthermore, by charging the battery 70 while the vehicle is stopped, it is possible to satisfy the needs of the driver who wants to use the electrical components of the vehicle.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

The invention claimed is:

1. A control apparatus of a hybrid vehicle, comprising: an input and output module for a driver to select a driving mode, wherein the driver enters an expected stopped time into the input and output module; an engine that generates a power required for driving a vehicle by fuel combustion; a driving motor that generates power required for driving the vehicle, the driving motor being configured to operate as a generator; a hybrid starter-generator (HSG) that starts the engine and is configured to operate as a generator; and a controller configured to perform a first charging mode that generates power with the engine to charge the battery through the driving motor, and to perform a second charging mode that generates power with the engine to charge the battery through the driving motor and the HSG; wherein the controller performs the first charging mode when a time required to reach a target SOC from a current SOC by using the output of the driving motor is within the expected stopped time input by the driver, and wherein the controller performs the second charging mode when a time required to reach the target SOC from the current SOC through the output of the driving motor exceeds the expected stopped time input by the driver.

2. The control apparatus of the hybrid vehicle of claim 1, wherein in the first charging mode, the controller turns on the engine, and the driving motor converts power outputted from the engine into electrical energy to charge the battery.

3. The control apparatus of the hybrid vehicle of claim 1, wherein in the second charging mode, the controller turns on the engine, and the driving motor and the HSG convert power outputted from the engine into electrical energy to charge the battery.

4. The control apparatus of the hybrid vehicle of claim 2, wherein when a position where the vehicle is stopped is in an idling restricted zone, the controller charges the battery only for a set time in the idling restricted zone.

5. A control method of a hybrid vehicle, comprising:
   receiving, by an input and output module, a driving mode of the hybrid vehicle;
   receiving, by the input and output module, an expected stopped time when the driving mode of the vehicle is in a stopped mode;
   determining, by a controller, a charging mode while the vehicle is stopped based on the expected stopped time, a current state of charge (SOC) of a battery, a target SOC, output of a driving motor, and output of an HSG; and
   charging the battery according to the charging mode while the vehicle is stopped;
   wherein when a time required to reach the target SOC from the current SOC by using the output of the driving motor is within the expected stopped time, the charging mode while the vehicle is stopped is determined to be the first charging mode; and
   wherein when a time required to reach the target SOC from the current SOC through the output of the driving motor exceeds the expected stopped time, the charging mode while the vehicle is stopped is determined to be the second charging mode.

6. The control method of the hybrid vehicle of claim 5, wherein the charging mode while the vehicle is stopped includes a first charging mode that charges the power generated by the engine in the battery through the driving motor and a second charging mode that charges the power generated by the engine in the battery through the driving motor and the HSG.

7. The control method of the hybrid vehicle of claim 5, further comprising:
   identifying, by a navigation device, an idling restricted zone on a driving route of the vehicle; and
   determining, by a GPS module, whether a position where the vehicle is stopped is the idling restricted zone.

8. The control method of the hybrid vehicle of claim 7, further comprising when the position where the vehicle is stopped is in the idling restricted zone, charging the battery for a limited time in the idling restricted zone.

* * * * *